March 26, 1968  R. H. HUGHES  3,375,389
ADJUSTABLE CONVERGENCE MAGNETS
Filed March 15, 1965  2 Sheets-Sheet 1
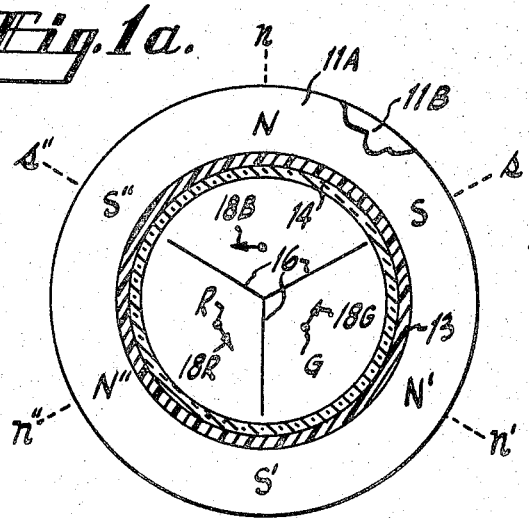
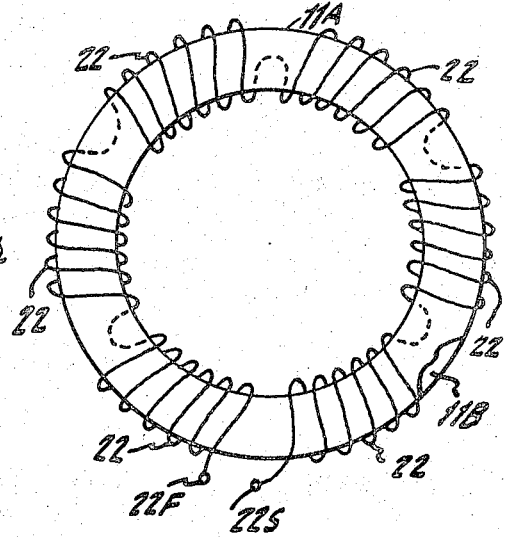
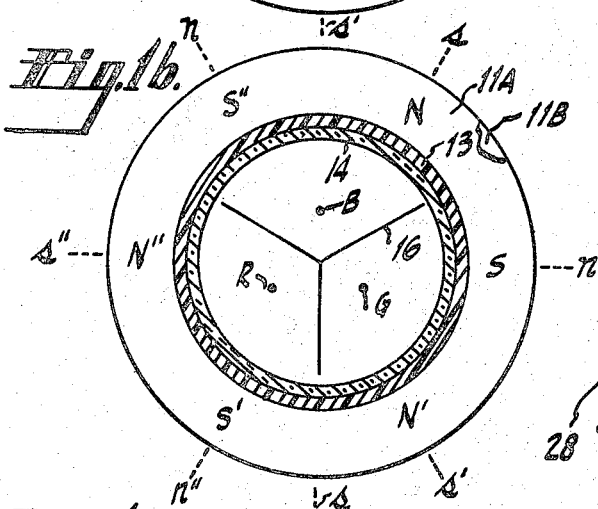
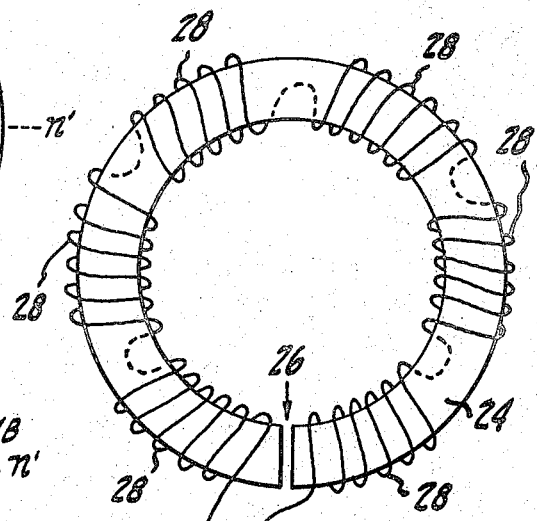
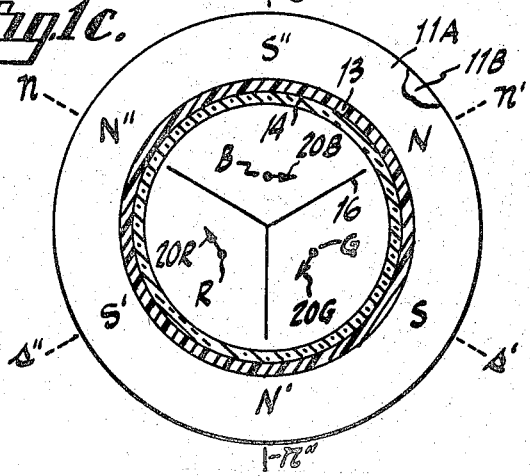
INVENTOR.
RICHARD H. HUGHES
BY
William H. Meagher
Attorney March 26, 1968  R. H. HUGHES  3,375,389
ADJUSTABLE CONVERGENCE MAGNETS
Filed March 15, 1965  2 Sheets-Sheet 2

INVENTOR.
RICHARD H. HUGHES
BY William H. Meagher
ATTORNEY

United States Patent Office 3,375,389
Patented Mar. 26, 1968

3,375,389
ADJUSTABLE CONVERGENCE MAGNETS
Richard H. Hughes, Lancaster, Pa., assignor to Radio Corporation of America, a corporation of Delaware
Filed Mar. 15, 1965, Ser. No. 439,599
8 Claims. (Cl. 313—77)

This invention relates generally to magnetic beam adjusting arrangements for a cathode ray tube, and, particularly, to arrangements suitable for relative beam position correction in a multibeam color kinescope.

A widely used form of color image reproducing device is the tri-gun, shadow-mask color kinescope. In operation of such a kinescope, it is intended that each of the beams produced by the three guns of the tube should selectively excite a particular set of phosphor dots luminescing in a particular primary color. To ensure that a particular beam selectively excites its assigned phosphor dots, the beam must approach the apertures of the shadow-mask that precedes the phosphor screen with the proper angle of approach. It is also important that the plurality of beams converge at the target to effect light production at coincident target regions. For such convergence purposes, there is conventionally associated with the tri-gun color kinescope a set of beam convergence magnets for effecting adjusting of the respective beam positions prior to their deflection.

Such beam convergence structures are usually called upon for both static and dynamic adjustments. The so-called static adjustments are made to ensure the establishment of the proper beam convergence at the center of the phosphor screen; the dynamic adjustments then serve to ensure maintenance of the proper convergence for the bundle of beams throughout their deflection from the center in the course of the raster scanning process.

To achieve the center-of-the screen static beam convergence, it has proved convenient to provide individual adjustment magnets for each beam, each magent being subject to manual adjustment to vary the position of the associated beam in a radial direction with respect to the kinescope axis. The guns of the conventional tri-gun, shadow-mask color kinescope are disposed in a triangular configuration within the kinescope neck; the triangle is conventionally oriented in such manner that the blue phosphor exciting gun is positioned along a radius which extends from the axis vertically (in terms of the normal display position of the phosphor screen). It will be appreciated that with such a positioning of the blue gun, adjustment of the blue beam position along a radius from the tube axis corresponds to adjustment of the blue beam in a vertical direction.

In order to provide ability to correct for all possible misconvergence errors, it is necesary to supplement the three individual beam adjustments in respective radial directions with a fourth adjustment parameter. One approach in the prior art to the provision of this fourth adjustment parameter is to provide means for shifting one of the kinescope beams in a direction perpendicular to the radial direction of movement provided for it in the static convergence apparatus; such action is usually associated with the blue beam (for which the radial movements are vertically directed), whereby the additional beam motion required is in a lateral direction. As explained more fully in my Patent No. 2,847,598, issued Aug. 12, 1958, it is advantageous to associate with the lateral shifts of the blue beam opposite-direction lateral shifts of the red and green beams, in order to reduce the range of motion required of any one beam to achieve correction. Such reduction is advantageous in minimizing the introduction of beam distortion, or spot size growth, in the position correcting operation.

The present invention is directed to novel structures for providing the above-discussed fourth adjustment parameter of beam position correction in a multibeam color image reproducing tube. In accordance with the approach of the present invention, a ring magnet having a multiplicity of pole pairs is employed, encircling the color kinescope neck, to provide correlated position shifts for all of the beams, in accord with the desire of minimizing the beam motion required of any one beam to achieve correction.

In certain of the embodiments of the present invention, the correcting effect provided is of the above-described lateral shift type. In other embodiments of the invention, each of the beams is moved in a respective direction perpendicular to the radial convergence motion direction associated with it, providing an overall "twist" effect. It is noted that the embodiments providing the twist type of correction are the most conserving of beam motion, while the embodiments providing only lateral direction shifts appear to be somewehat easier for operator adjustment.

In accordance with certain embodiments of the invention a pair of adjoining permanent magnet rings are employed in the correcting device, with equal-and-opposite rotations of the paired rings over a 60° arc enabling adjustment from maximum correction in one direction through a substantially zero minimum to maximum correction in the opposite direction. In accordance with one modification of the basic arrangement, only a single permanent magnet ring is required, with 60° arcuate rotation thereof likewise achieving adjustment over the full correction range. In accordance with other modifications, a single electromagnet ring is employed in fixed position, with adjustment of amplitude and polarity of the energizing current serving to vary the magnitude and sense of correction.

It is a primary object of the present invention to provide novel and improved magnetic beam position adjusting arrangements of aid in achieving the proper beam convergence in a multiple beam color image reproducing tube.

A particular object of the present invention is to provide for beam position correction use novel magnetic devices of a ring magnet form and incorporating multiple pole pairs, arranged so that the desired correction may be effected in a facile, motion-conserving manner.

Other objects and advantages of the present invention will be readily recognized by those skilled in the art upon a reading of the following detailed description and an inspection of the accompanying drawings in which:

FIGURES 1a, 1b and 1c illustrate, in respective positions of adjustment, a beam position correcting device employing a pair of six-pole permanent magnet rings in accordance with an embodiment of the present invention;

FIGURE 2 illustrates magnetization apparatus which may be employed in achieving the six-pole magnetization pattern desired for the rings of the device shown in FIGURE 1a;

FIGURE 3 illustrates an electromagnetic correcting device in accordance with a further embodiment of the present invention;

Figure 4A:
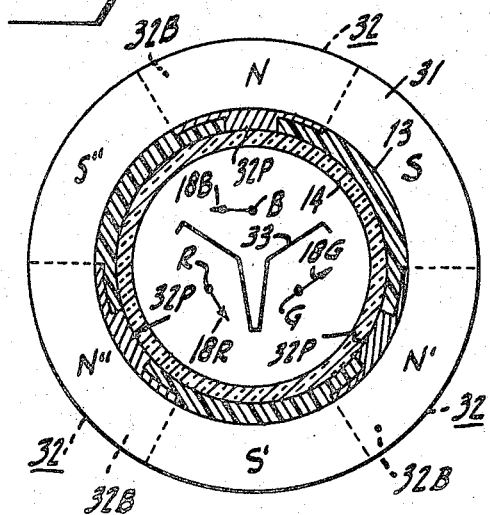
FIGURES 4a and 4b illustrate, in respective positions of adjustment, an embodiment of the present invention requiring only a single permanent magnet ring.

A beam position correcting device in accordance with an embodiment of the present invention is illustrated in plan view, in several different positions of adjustment, in FIGURES 1a, 1b and 1c. The device comprises a pair of permanent magnet rings 11A, 11B, rotatably mounted in adjacent positions about a cylindrical mount structure, of nonmagnetic material, generally designated 13, which encircles the neck 14 (illustrated in cross section) of a tri-gun color kinescope. Each of the rings (illustratively, of isotropic magnetic material, such as one percent carbon steel) is magnetized in a symmetrical, six-pole magnetic configuration. The respective pole locations for ring 11A are indicated by the capital letters designations N, S, N′, S′, N″, S″, while the pole locations of the (generally hidden) ring 11B are indicated by the lower case designation n, s, n′, s′, n″, s″.

In the region of the tube neck enclosed by the correcting device rings, a Y-shaped arrangement of vanes 16 of magnetic material magnetically isolates the nominal locations of the three kinescope beams, the nominal locations being designated by the dots labelled R, G and B (and corresponding to the central axes of respective electron gun electrodes that have not been illustrated in order to simplify the drawings). The vanes 16 represent one form of internal magnetic pole piece or field former structure with which the correcting device of the present invention may be associated; however, as will be more readily recognized subsequently, other forms of internal pole pieces may be associated with the correcting devices, or the devices may be used without the aid of internal magnetic structure.

In the rotational adjustment position illustrated in FIGURE 1a, the pole locations of ring 11A coincide with corresponding pole locations of the adjacent ring 11B. Coincident north poles of the two rings are aligned with a radius extending from the tube neck axis through the nominal blue beam location B. The beam position shifts associated with each of the three beams when the respective rings 11A and 11B are in their FIGURE 1a position of adjustment are indicated on the drawing by the arrows 18R, 18G and 18B. It will be noted that the direction of motion associated with each beam is substantially at right angles to a radius extending from the tube neck axis through the nominal location of that beam. Since, as previously discussed, the static convergence adjustment otherwise provided for each beam produces a shift of each beam in the radial direction, it will be appreciated that the correcting device of FIGURE 1a is providing a facility for further shift of each beam at right angles to that beam's direction of static convergence motion. The overall effect may be viewed as providing a "twist" of the three beam array. The rotational adjustment position illustrated in FIGURE 1a represents one extreme of correction provided by the magnetic ring device.

The opposite adjustment extreme is illustrated in FIGURE 1c. In adjustment from the FIGURE 1a position to the FIGURE 1c position, the respective rings 11A and 11B have been rotated in opposite directions over a 60° arc. It will be noted that such conjoint, opposite-direction rotations of the two rings results again in a coincidence of pole locations for the adjacent rings. However, in contrast with FIGURE 1a positions, the north and south pole locations have been mutually exchanged. Thus, for example, where the poles aligned with the radius of the tube neck axis through the nominal blue beam location B were (in FIGURE 1a) north poles N and n, the poles so aligned in FIGURE 1c are south poles S″ and s. As indicated by arrows 20B, 20R and 20G, the beam shifts provided in the FIGURE 1c situation are again perpendicular, in each case, to the radial static convergence motion associated with the beam; however, in each case, the shifts are oppositely directed to those associated with the FIGURE 1a ring positions. FIGURE 1c thus represents rotational adjustment positions providing a maximum "twist" of the three-beam array in the opposite sense to the maximum twist provided per FIGURE 1a.

FIGURE 1b illustrates the half-way point of rotational adjustment between the extremes of FIGURES 1a and 1c. In this half-way position, representing a 30° rotational shift in a first direction for ring 11A (relative to the position illustrated in FIGURE 1a) and an opposite directional rotational shift of 30° for the adjacent ring 11B. In the resultant positions, each north pole of ring 11A is directly adjacent to a south pole of the adjacent ring 11B, and vice versa. When opposite magnetic poles of the adjacent ring thus coincide, each magnet ring acts as a shunt for the other; nearly all the magnetic flux is confined to the air gap between the magnet rings and the material itself. Only very weak leakage fields from each magnet ring will be present in the ring apertures; these fields will be oppositely directed, and will therefore mutually cancel. As suggested by the absence of arrows in the showing of FIGURE 1b, substantially no shift of the beams is produced in this position of adjustment. Thus, it will be appreciated that equal-and-opposite rotations of the adjacent rings 11A and 11B over respective 60° arcs provides a transition from maximum correction in one direction through a substantially zero correction position to substantially maximum correction in the opposite direction.

FIGURE 2 is illustrative of one way in which the previously discussed six-pole pattern of magnetization of the rings 11A and 11B may be effected. In the illustrated technique, wire is wrapped about a pair of adjacent rings in such a manner as to form six symmetrically spaced coils about the ring periphery, the direction of coil winding alternating with successive coils about the periphery. Current is passed through the series of coils 22, as by coupling a storage battery between the end terminals 22S and 22F of the coil arrangement. After current passage has produced the desired magnetization pattern in the material of the ring pair, the coils are removed.

Other techniques than that illustrated in FIGURE 2 may be used to provide the desired six-pole magnetization pattern. For example, an alternative magnetization method employing a six-spoked, hexagonal core magnetizer is illustrated and discussed in the copending application of Joseph LeRoy Werst, Ser. No. 439,602, filed concurrently herewith and entitled "Beam Controlling Device."

As an alternative to the use of permanent magnet rings in practice of the present invention, an electromagnet ring may be employed as shown in FIGURE 3. The core 24 of the electromagnet of FIGURE 3 is in the form of a ring (of magnetically soft iron, for example) split at one point in its periphery to provide an air gap 26. Six coils 28 are wound about the core 24 in symmetrically spaced positions about the core periphery, with the winding of alternate coils being reversed. The coils 28 are connected in series across a source 30 of current adjustable in amplitude and polarity. In contrast with the permanent magnet ring version of FIGURE 1a, only a single electromagnet ring is required, and the core 24 and its mounted coils 28 may remain in a fixed rotational position on the tube neck. A preferable rotational position places the gap 26 remote from the nominal blue beam location but in vertical alignment therewith.

Alterations in the magnitude of beam shifts are provided by adjusting the amplitude of the current supplied by source 30 to the coils 8; adjustment of the sense of the correction is effected by altering the polarity of the current supplied to coils 28.

Figure 4B:
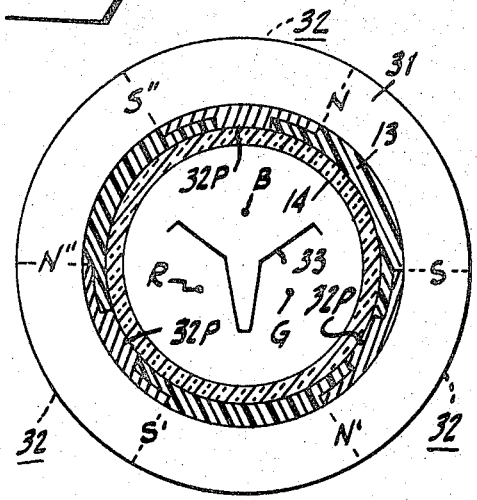

FIGURES 4a and 4b are illustrative of a modification of the permanent magnet ring device of FIGURE 1a, the modification providing a correcting device requiring only a single permanent magnet ring. The single six-pole magnet ring 31 of the FIGURE 4 device is rotatable about the tube neck 14, as in the FIGURE 1a embodiment. However, maintained in fixed rotational position in the FIGURE 4 device are three symmetrically spaced external pole pieces or field formers 32. Each of the field formers 32, which may be of such material as mμ metal, are provided with a broad arcuate base 32B, extending for an arcuate distance of 60°, from which extend narrower inward projections 32P. The fixed positions of the field formers 32 are such that the respective projections 32P are each symmetrically aligned with respect to a radius extending from the tube neck axis through a respective one of the nominal beam locations.

In the rotational position of ring 31, illustrated in FIGURE 4a north pole N is aligned with the radius through the blue beam location, north pole N' is aligned with the radius through the green beam location and north pole N" is aligned with the radius through the red beam location. This provides a maximum beam shift effect of the same type as shown in FIGURE 1a. It should be appreciated that a 60° rotation in either direction of ring 31 will substitute the south poles of the ring for the north poles in the positions of alignment with the radii passing through the nominal beam locations. The result of such positioning would be maximum correction in the opposite direction; i.e. correction of the form illustrated in FIGURE 1c.

FIGURE 4b is illustrative of the half-way point of rotational adjustment of ring 31 between the above-discussed extremes. In the FIGURE 4b position there is substantially no beam shift produced, since each of the field formers 32 acts as a shunt or "keeper" for a respectively associated pole pair. Thus, for example, flux between north pole N and south pole S is substantially confined to the field former 32 associated with the blue beam location.

It will be noted that, in FIGURES 4a and 4b, a shield 33 of a notched-Y shape has been shown as another example of internal pole piece structure with which correcting devices pursuant to the present invention may be associated. Still another example is the two-piece unit shown in FIGURE 4 of my aforesaid Patent No. 2,847,598. Moreover, as suggested, for example, in FIGURE 5 herein (to be subsequently described), internal pole piece structure may be dispensed with altogether.

In all of the previously discussed embodiments, the correcting effect obtained through use of the invention is of the "twist" type. It can be demonstrated that such a beam shift technique is the most conserving of beam motion required for correction, and therefore is the least likely to introduce undesired distortions of the beam. However, it has been observed that beam shift techniques of the previously discussed opposing-lateral type appear to be somewhat easier for operator adjustment; i.e., a human operator manipulating the device tends to find the single motion direction type of adjustment easier to employ in arriving at a correct setting. The multiple pole pair magnet ring approach of the present invention may be adapted for lateral type correction as well as the previously discussed twist type of correction, as will be appreciated from a consideration of FIGURES 5 and 6.

Figure 5:
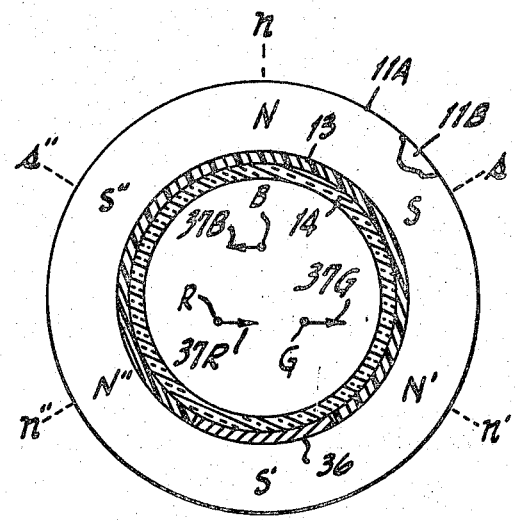
FIGURE 5 illustrates a modification of the apparatus of FIGURE 1a, enabling achievement of lateral correcting effects.

FIGURE 5 is illustrative of one manner in which the apparatus of FIGURE 1a may be modified to achieve the lateral type correction. Comparison of the figures will reveal that the modification involves the association of a fixed-position magnetic shunt 36 with the rotatable magnet rings. The magnetic shunt 36 is arcuately shaped, and positioned (as by imbedding in the cylindrical mount structure 13") below the red and green beam locations and remote from the blue beam location, and extending symmetrically on either side of a vertical radius through the tube axis. The effect is to shape the magnetic fields in the red and green beam locations such that the flux is essentially vertically directed through these locations. The net effect, as indicated by the arrows 37R, 37G and 37B, is to produce red and green beam shifts that are laterally directed (rather than tangentially directed), but in an opposite sense to the lateral direction of motion of the blue beam. While FIGURE 5 illustrates only one position of ring rotation (corresponding to that shown in FIGURE 1a), it should be readily appreciated that as the rings are shifted equally and oppositely from the illustrated position, there will be a transition of the correcting effect from a maximum in the direction shown in FIGURE 5 through a substantially zero correction position (when the ring positions will be as shown as in FIGURE 1b) to a maximum lateral correction in a sense opposite from that shown in FIGURE 5 (when the full 60° rotations have placed the rings in positions illustrated in FIGURE 1c).

Figure 6:
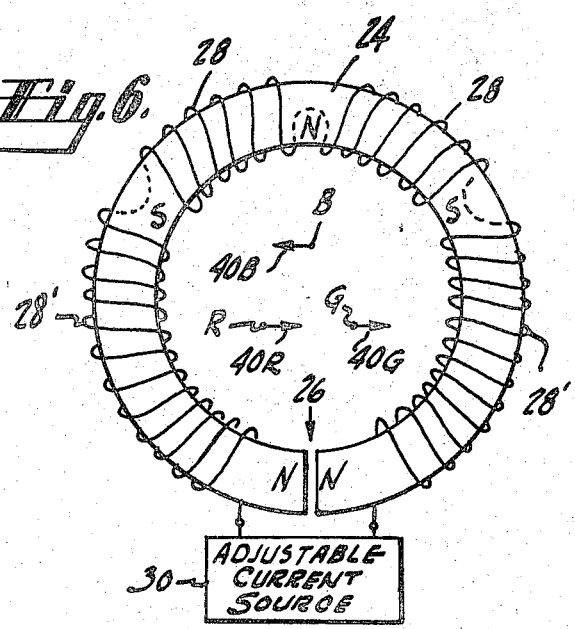
FIGURE 6 illustrates a modification of the electromagnet version of FIGURE 3, also enabling achievement of lateral correcting effects.

FIGURE 6 is illustrative of one manner in which the electromagnet embodiment of FIGURE 3 may be modified to provide a correcting effect of the lateral type. Comparison of the figures will reveal that in the FIGURE 6 device, two of the coils of the FIGURE 3 device have been omitted, while two of the remaining coils (28') have been lengthened. The effect is to provide a four-pole magnet ring, with like poles at opposite ends of a vertical radius through the tube axis; opposing polarity poles are located at symmetrical positions spaced approximately 60° on either side of the pole most closely associated with the nominal blue beam position. Pole designations and beam shift directions (the latter being indicated by the arrows designated 40R, 40G and 49B) have been indicated in FIGURE 6 for one direction of current from source 30. As shown, the red and green beam shifts are laterally directed in opposition to the lateral direction of motion of the blue beam. The illustrated directions of beam motion may be reversed by reversing the direction of current from source 30.

While reliance may be placed on the operator, aided by suitable reference indicia marked on the rotatable rings, to effect properly correlated rotations of the adjacent rings, in use of such embodiments of the invention as are shown in FIGURES 1a and 5, it appears preferable to provide the correcting device with some structure for automatically correlated the ring rotations. In this regard, it should be noted that a particularly advantageous mechanical arrangement for ensuring the equal-and-opposite rotations of the rings of the present invention, involving a floating pin linkage system, is disclosed and described in detail in the aforementioned Werst application, Ser. No. 439,602, concurrently filed herewith.

What is claimed is:
1. In combination,
a cathode ray tube having a neck enclosing the paths of a trio of individual cathode ray beams, said trio of beam paths being symmetrically disposed about the longitudinal axis of said tube neck;
and means for producing a plurality of magnetic fields intersecting said paths, the orientation of the magnetic field intersecting one of said paths differing from the orientation of the magnetic fields intersecting the remainder of said paths so as to move one of said beams in a direction different from the directions of motion of the remainder of said beams;
said field producing means comprising a pair of six-pole permanent magnet rings mounted on said cathode ray tube neck in adjacent, axially aligned positions, each of said rings being rotatable about said enclosed beam paths and each having a magnetization pattern consisting of a trio of north poles equally spaced about the ring periphery and a trio of south poles in respective equally spaced positions about said periphery symmetrically intervening between adjacent ones of said north poles.
2. In combination,
a cathode ray tube having a neck enclosing the paths of a trio of individual cathode ray beams, said trio of beam paths being symmetrically disposed about the longitudinal axis of said tube neck;
and means for producing a plurality of magnetic fields intersecting said paths, the orientation of the magnetic field intersecting at least one of said paths differing from the orientation of the magnetic fields intersecting the remainder of said paths so as to shift the position of one of said beams in a direction different from the direction of beam shift of the remainder of said beams, said plurality of fields being conjointly adjustable in magnitude and in sense;

said field producing means including a magnet ring having a magnetization pattern comprising a trio of north poles equally spaced about the ring periphery and a corresponding trio of south poles in respective equally spaced positions about said periphery symmetrically intervening between adjacent ones of said north poles, said ring being mounted on said cathode ray tube neck so as to encircle said beam paths.

3. Apparatus in accordance with claim 2 wherein said magnet ring comprises an electromagnet having six coils encircling said ring in symmetrically spaced locations along the ring periphery, and wherein said field producing means also includes an adjustable current source connected to energize said coils, with adjustment of the amplitude of the energizing current serving to effect the conjoint adjustment of the magnitude of said plurality of fields and with alteration of the polarity of the energizing current reversing said poles to effect the conjoint adjustment of the sense of said plurality of fields.

4. Apparatus in accordance with claim 2 wherein said magnet ring comprises a permanent magnet, and wherein said field producing means also includes a neck encircling support for said ring about which support said ring is rotatable, said support including a trio of pole pieces symmetrically spaced along its periphery, with rotation of said ring relative to said pole pieces effecting the conjoint adjustment in magnitude and in sense of said plurality of fields.

5. Apparatus in accordance with claim 2 wherein said magnet ring comprises a permanent magnet, and wherein said field producing means also includes a second permanent magnet ring having the same magnetization pattern as said first-named ring and also mounted on said neck so as to encircle said beam paths, the rotational positioning of said rings relative to each other being adjustable to effect the conjoint adjustment in magnitude and in sense of said plurality of fields.

6. A beam position correcting device for use with a color kinescope having a neck enclosing the paths of a trio of individual electron beams symmetrically disposed about the longitudinal axis of said tube neck, said device comprising the combination of a support having a central aperture dimensioned to permit mounting of said support about said tube neck, and a pair of six-pole, permanent magnet rings mounted for individual rotation about said apertured support in closely adjacent, parallel planes, each of said rings having a magnetization pattern consisting of a trio of north poles equally spaced about the ring periphery and a trio of south poles in respective equally spaced positions about said periphery symmetrically intervening between adjacent ones of said north poles; said pair of magnet rings producing when in a first position of rotational adjustment a first magnetic field of a first direction in a first region of said central aperture and second and third magnetic fields both of a second direction opposite to said first direction in respective second and third regions of said central aperture, with equal-and-opposite rotations of said pair of magnet rings through a 60° arc relative to said first position of rotational adjustment producing fields in said first, second and third regions of magnitudes corresponding to those obtained in said first position of rotational adjustment but with individually reversed directions.

7. In combination,
a color kinescope having a neck enclosing the paths of a trio of individual electron beams, said trio of beam paths being symmetrically disposed about the longitudinal axis of said tube neck;

and means for producing a plurality of respective beam position adjusting magnetic fields intersecting said paths, the magnetic field intersecting one of said paths being oriented differently than the magnetic fields intersecting the remainder of said paths so as to move the beam associated with said one path in a direction differing from the directions of motion of the remainder of said beams;

said field producing means comprising a pair of six-pole permanent magnet rings mounted on said cathode ray tube neck in adjacent, axially aligned positions, each of said rings being rotatable about said enclosed beam paths, and having a magnetization pattern consisting of a trio of north poles equally spaced about the ring periphery and a trio of south poles in respective equally spaced positions about said periphery symmetrically intervening between adjacent ones of said north poles, with conjoint equal-and-opposite rotations of said rings over an arcuate distance of 60° enabling variation of said beam position adjusting fields over a continuous range extending from a condition providing maximum beam position adjustment in a first sense through a substantially zero beam position adjustment condition to a condition providing maximum beam position adjustment in a second sense opposite to said first sense.

8. In combination,
a color kinescope having a neck enclosing the paths of a trio of electron beams, said trio of beam paths being symmetrically disposed about the longitudinal axis of said tube neck;

and means for producing a plurality of respective beam position adjusting magnetic fields within said neck, one of said beam position adjusting magnetic fields produced within said neck causing motion of one of said trio of beams in a direction opposite to the direction of motion of the remaining pair of said beams, said mutually opposite directions of motion providing lateral shifts of the relative beam positions, said plurality of fields being conjointly adjustable in magnitude and in sense;

said field producing means comprising a pair of six-pole permanent magnet rings mounted on said cathode ray tube neck in adjacent, axially aligned positions, each of said rings being rotatable about said enclosed beam paths, with conjoint equal-and-opposite rotations of said rings over an arcuate distance of 60° enabling variation of said beam position adjusting fields over a continuous range extending from a condition providing maximum lateral beam position adjustment in a first sense through a substantially zero beam position adjustment condition to a condition providing maximum lateral beam position adjustment in a second phase opposite to said first sense;

the magnetization pattern of each of said six-pole rings consisting of a trio of north poles equally spaced about the ring periphery and a trio of south poles in respective equally spaced positions about said periphery symmetrically intervening between adjacent ones of said north poles.

References Cited
UNITED STATES PATENTS

| | | | |
|---|---|---|---|
| 2,722,617 | 11/1955 | Cluwen et al. | 335—302 X |
| 3,290,534 | 12/1966 | Kratz | 313—77 |
| 2,950,407 | 8/1960 | Barkow et al. | 313—70 |
| 3,098,942 | 7/1963 | Reiches | 313—77 |

ROBERT SEGAL, *Primary Examiner.*

JAMES W. LAWRENCE, DAVID J. GALVIN,
*Examiners.*